(12) United States Patent
Bulman

(10) Patent No.: US 12,260,772 B2
(45) Date of Patent: Mar. 25, 2025

(54) SELF-MOVING EDUCATIONAL TOY

(71) Applicant: QUBS AG, Küsnacht (CH)

(72) Inventor: Hayri C. Bulman, Küsnacht (CH)

(73) Assignee: QUBS AG, Küsnacht (CH)

( * ) Notice: Subject to any disclaimer, the term of this patent is extended or adjusted under 35 U.S.C. 154(b) by 240 days.

(21) Appl. No.: 17/255,241

(22) PCT Filed: Jun. 29, 2018

(86) PCT No.: PCT/EP2018/067680
§ 371 (c)(1),
(2) Date: Dec. 22, 2020

(87) PCT Pub. No.: WO2020/001789
PCT Pub. Date: Jan. 2, 2020

(65) Prior Publication Data
US 2021/0134181 A1    May 6, 2021

(51) Int. Cl.
*G09B 19/00*    (2006.01)
*A63H 17/395*    (2006.01)
(Continued)

(52) U.S. Cl.
CPC ....... *G09B 19/0053* (2013.01); *A63H 17/395* (2013.01); *G05D 1/0234* (2013.01);
(Continued)

(58) Field of Classification Search
CPC .. G09B 19/0053; A63H 17/42; A63H 17/395; A63H 17/40; G05D 1/0234; A47L 2201/04
See application file for complete search history.

(56) References Cited

U.S. PATENT DOCUMENTS 5,656,907 A * 8/1997 Chainani ............ G09B 19/0053
318/587
2004/0214642 A1    10/2004 Beck
(Continued)

FOREIGN PATENT DOCUMENTS

EP       32 82 327 A1       2/2018
WO    WO 2009/037677 A1    3/2009

OTHER PUBLICATIONS

EPO (Riswijk, NL), English language version of the International Search Report, Form PCT/ISA/210, for International Application PCT/EP2018/067680, Mar. 1, 2019 (3 pages).

*Primary Examiner* — Peter R Egloff
(74) *Attorney, Agent, or Firm* — Pauley Erickson & Swanson

(57) ABSTRACT

An educational toy (1) includes a self-moving vehicle (10) adapted to move and steer freely on a two-dimensional surface (2) such as a table leaf. A tangible, three-dimensional marker (20) includes at least one RFID tag (21) is used to wirelessly trigger a specific action of the vehicle (10), e.g. turn 90 degrees right, when the vehicle (10) enters a readout range of the marker (20). The marker (20) can be placed freely on the surface (2) and cannot be overrun by the vehicle (10). Thus, the vehicle (10) is instructed to perform a certain action, e.g. take a 90 degrees left turn, using the marker (20). Then, the vehicle (10) moves forward until a next marker (20') is found from which the vehicle (10) receives its next instruction. This enables the educational toy (1) to teach programming during play, which reduces the risk that a user will lose interest.

20 Claims, 3 Drawing Sheets

(51) Int. Cl.
  *G05D 1/00* (2006.01)
  *G09B 1/32* (2006.01)
  *A63H 11/20* (2006.01)

(52) U.S. Cl.
  CPC ......... *G05D 1/0268* (2013.01); *G05D 1/0287* (2013.01); *G09B 1/325* (2013.01); *A63H 11/20* (2013.01); *A63H 2200/00* (2013.01)

(56) References Cited

U.S. PATENT DOCUMENTS

| | | | |
|---|---|---|---|
| 2005/0022273 A1* | 1/2005 | Maeki | G05D 1/0274 901/1 |
| 2007/0042844 A1* | 2/2007 | Stote, III | A63B 59/50 473/564 |
| 2009/0081923 A1 | 3/2009 | Dooley et al. | |
| 2010/0203933 A1 | 8/2010 | Eyzaguirre | |
| 2013/0072083 A1 | 3/2013 | Ghaly | |
| 2014/0342834 A1* | 11/2014 | Tappeiner | A63F 13/00 463/42 |
| 2015/0095883 A1* | 4/2015 | Shi | G06F 8/34 717/109 |
| 2017/0007915 A1* | 1/2017 | Moscatelli | A63H 17/395 |
| 2018/0264652 A1* | 9/2018 | Tsuchiya | A63H 17/36 |

* cited by examiner

SELF-MOVING EDUCATIONAL TOY

BACKGROUND OF THE INVENTION

Field of the Invention

The present invention relates to a self-moving toy for educational purposes which is controllable by a wireless readout of tangible three-dimensional markers. The toy as well as the markers can be placed freely on a surface.

Discussion of Related Art

Robots for educational purposes are known, especially for the purpose of teaching children with no or little experience of programming languages how to program a computer.

EP 3 282 327 A1 discloses such a programmable robot for educational purposes comprising a body and a separate head, which robot scans an area between the wheels of the robot for certain information carrying cards and on navigating over a street of such cards responds with specific actions.

The disclosed device has the disadvantage, however, that the robot cannot move freely on a surface and particularly depends on a closed street of cards for navigation. Thus, its educational impact is limited.

SUMMARY OF THE INVENTION

Hence it is an objective of the invention to provide an improved educational toy that at least partially overcomes these drawbacks.

This objective is achieved by a device of the independent claim.

Accordingly, an educational toy comprises at least one self-moving vehicle which is adapted to move and steer freely on a two-dimensional surface. The terms "self-moving" and "move and steer freely on a two-dimensional surface", respectively, are to be interpreted in such a way that the vehicle has a locomotion ability, e.g. by means of electrically driven legs or wheels, and is able to move and steer without additional mechanical guidance on the two-dimensional surface, e.g. by means of rails or similar. This surface can be a preexisting sur face such as a living room floor or a table leaf or it can be provided together with the toy, e.g. in the form of a carpet which can for example comprise certain predefined printed artwork such as buildings and streets, but which does not provide mechanical guidance to the vehicle. In other words, the "surface" specifically does not comprise rails or other mechanical means which define or limit a possible route of the self-moving vehicle on the surface.

The toy further comprises at least one tangible, three-dimensional marker comprising at least one machine-readable information item, e.g. an RFID tag. The marker, as well as the vehicle, is adapted to be placeable freely on the surface, i.e. without additional mechanical limitations or constraints. The marker thereby has a height above the surface that is larger than a ground clearance of the self-moving vehicle. Thus, the vehicle cannot pass over the marker.

Further, the self-moving vehicle comprises at least one sensor which is adapted for a wireless readout of the machine-readable information item of the marker. Thus, the vehicle can, by means of the sensor, detect, e.g. the presence, position, distance, bearing and/or other features of the marker. Further, the vehicle comprises a control unit (e.g. a microcontroller incl. memory) which is adapted for controlling the self-moving vehicle depending on the machine-readable information item as read out by means of the sensor. Thus, certain actions of the vehicle can e.g. be triggered as soon as the vehicle wirelessly senses the presence and/or position and/or distance and/or an instruction stored on the marker and/or other features of the marker by means of the sensor. In such a way, programming of computers (i.e. the "vehicle") can be taught to children in a playful and fun way.

In an advantageous embodiment, the toy is adapted to trigger at least one action of the self-moving vehicle in response to the machine-readable information item being read out by the sensor. For example, the vehicle can take a left turn as soon as it passes a specific marker with "left-turn instructions" stored therein (see below). Thus, a feedback of the vehicle becomes possible, e.g. when the vehicle plays a sound while passing a certain marker (see below). In such a way, programming of computers (i.e. the "vehicle") can be taught to children in a playful and fun way while direct feedback to the children is enabled.

In such a case, in another advantageous embodiment, the toy is adapted to only trigger the action of the self-moving vehicle when the self-moving vehicle is within a predetermined distance threshold to the marker (i.e. closer to the marker than the distance threshold) which comprises the machine-readable information item. This distance threshold is preferably 20 cm, more preferably 5 cm. This distance threshold can correspond to a wireless range of the machine-readable information item—sensor—combination, i.e. to a distance in which the sensor can read out the information. Thus, an "information overload", e.g. by a plurality of markers, is easier to prevent and the vehicle can only respond to a marker in its vicinity which simplifies the triggering of marker-specific actions of the vehicle.

More advantageously, the toy further comprises a configurator for configuring the triggered action of the self-moving vehicle in response to the machine-readable information item as read out by the sensor of the vehicle. This configurator is, e.g. in form of a dedicated tablet or off the shelf tablet computer with a custom app which comprises a number of different hardware or software buttons for setting a specific action which is to be carried out by the vehicle when it reads the information item of the specific marker. Another option for the configurator is in the form of a smartphone app.

Thus, a certain marker can be more easily "reconfigured" which improves the educational impact of the toy.

Preferably, in such a case, the toy is adapted to store configuration data related to the triggered action of the self-moving vehicle in response to the machine-readable information item of the specific marker as read out by the sensor. As an example, a marker with an RFID serial number 08:A8:BF:C0 might have a default action of "turn 90 degrees left" as, e.g. stored on the marker's RFID tag as a hexadecimal instruction code 0x47. Using the configurator, the marker can be reconfigured to trigger "make a left U turn", e.g. by storing a hexadecimal instruction code 0x48 on the RFID tag. Thus, many different "marker configurations" become possible. This configuration data is preferably stored within the marker itself (e.g. in the machine-readable information item). Optionally, it can also be stored in the vehicle, e.g. in a volatile or non-volatile memory connected to the control unit. In the first case, no data needs to be written to the vehicle by means of the configurator, but the marker contains all the required information, e.g. as hexadecimal instruction codes (see above) in the machine-readable information item. In the second case, as the vehicle reads the RFID serial number 08:A8:BF:C0, the associated action could be read from the vehicle's memory and executed by the vehicle.

Thus, a certain marker can be more easily "reconfigured" which improves the educational impact of the toy.

A triggered action of the vehicle as described above advantageously comprises at least one of the group consisting of:
- a starting of a movement of the self-moving vehicle, e.g., a forward movement with a speed of 1 m in 12 sec; other velocities are possible as well;
- an acceleration of the self-moving vehicle;
- a braking of the self-moving vehicle;
- a stopping of a movement of the self-moving vehicle;
- a left turning of the self-moving vehicle, e.g. in front of or behind the marker, in particular by 90 degrees;
- a right turning of the self-moving vehicle, e.g. in front of or behind the marker, in particular by 90 degrees;
- a left or right U-turning (e.g. around the marker, e.g. with a turn radius of 30 cm) or turning around (e.g. on the spot) of the self-moving vehicle;
- a playing of an audio signal (e.g. the blowing of a horn or the audio playback of a story related to a roaring lion in the jungle when a lion-shaped marker is detected) by means of (e.g. a loudspeaker of) the self-moving vehicle;
- a reversing of a direction of movement of the self-moving vehicle (e.g. from forward to reverse); and
- a turning on or off of a light source of the self-moving vehicle.

As a consequence, a plurality of actions can be triggered which improves the educational impact of the toy by means of an improved interaction between children and the toy.

In another advantageous embodiment of the toy, the self-moving vehicle further comprises an image acquisition device, e.g. a camera, for acquiring an image, e.g. of the surroundings of the vehicle. The image acquisition device can be mounted movably on the vehicle, i.e. it can then look into different directions. The control unit of the self-moving vehicle is adapted for con trolling the self-moving vehicle depending on the acquired image. Thus, a more interactive control of the vehicle depending on the surroundings becomes possible.

Then, advantageously, the image comprises the marker (i.e. the marker can be seen in the acquired image) and the control unit of the self-moving vehicle is adapted for controlling the self-moving vehicle depending on the marker in the image (e.g., its position and/or bearing and/or distance with regard to the vehicle). As an example, the vehicle can move towards a next marker on its route while passing the marker on its left or right side when approaching it. A plurality of different computer vision based image recognition/classification methods are available for feature extraction, some of which rely on artificial intelligence/deep learning technologies. These are known to the skilled person and shall not be further described herein. Thus, a more interactive control of the vehicle depending on the surroundings becomes possible.

In another advantageous embodiment of the toy, the self-moving vehicle further comprises
- a battery, in particular a rechargeable battery such as a LiPo battery;
- an electric motor; and
- wheels and/or chains and/or legs adapted to be placeable on the surface.

Thus, the features "self-moving" and "move and steer freely on the surface" are easier to achieve without additional mechanical limitations.

In yet another advantageous embodiment of the toy, the machine-readable information item comprises at least one group consisting of
- an RFID and/or NFC tag (on or in the marker);
- a bar code (on the marker);
- a QR code (on the marker);
- a color (of the marker);
- a shape (of the marker); and
- a visible sign (on the marker).

Thus, the information item of the marker can be more reliably sensed by means of the sensor (e.g. an RFID reader which can be augmented by a camera and/or an ultrasonic sensor) of the self-moving vehicle (e.g. by means of an RFID broadcast—echo sequence).

Preferably, the marker is a passive device, and in particular does not comprise an energy source.

This keeps production costs low and simplifies maintenance of the toy because, e.g. no batteries need to be replaced for the marker.

Advantageously, the marker comprises elements made of wood, plastic, or cardboard, and in particular is made predominantly of wood, plastic, or cardboard. Thus, an interaction of small children with the marker becomes more playful and fun while maintenance is simplified and production costs are kept low.

The toy preferably comprises more than one marker, wherein each marker comprises at least one machine-readable information item and each marker is adapted to be placeable freely on the surface. Thus, a more complex educational experience is facilitated because the self-moving vehicle can, e.g. be navigated along a route of a plurality of markers with free space in between. Then each marker can trigger a specific action of the self-moving vehicle, e.g. turn left on the first marker, blow a horn on the second marker, turn right on the third marker, tell a lion story on the fourth marker, make a U turn with a turn radius of, e.g. 30 cm on the fifth marker, and stop on the sixth marker.

Then, advantageously, at least two markers are machine-distinguishable by the self-moving vehicle, in particular by means of the respective machine-readable information items (e.g. the markers' RFID serial numbers and/or instruction sets stored therein). Thus, a more complex educational experience is facilitated because different markers can trigger different actions. An assignment of a specific marker or a group of specific markers to a specific vehicle and/or route is also possible, for example by storing a route assignment in the machine-readable information item(s) of the corresponding marker(s).

In another advantageous embodiment, the self-moving vehicle further comprises an obstacle sensor for sensing an approach of the self-moving vehicle to an obstacle, e.g. an edge of a table leaf as surface or a wall of the living room floor as surface. Then, preferably, the control unit of the self-moving vehicle is adapted for stopping the movement of the self-moving vehicle on approach of the obstacle, e.g. to prevent a drop of the vehicle from the table. Optionally, an acoustic warning signal can be played, the vehicle can turn around, stop and wait for further instructions. Thus, the safety of the toy is improved.

In another preferred embodiment, the self-moving vehicle further comprises a bearing sensor (e.g. a magnetometer, gyroscope, and/or accelerometer) for monitoring a direction of movement of the self-moving vehicle. Thus, additional information about the actual path of movement of the self-moving vehicle can be more easily gathered. Then, preferably, the control unit of the self-moving vehicle is adapted for adjusting the direction of movement of the self-moving vehicle depending on the actual movement as monitored by the bearing sensor. Thus, it is easier to, e.g. ensure straight movements of the vehicle in the free space between single markers, in particular on slightly uneven surfaces. Also, other more advanced options arise, the vehicle can, e.g. scan the surroundings for the next marker (e.g. via its image acquisition device in combination with object recognition algorithms as bearing sensor) and adjust its movement direction towards this marker, while in the marker's vicinity, the marker is then passed on its left or right side. Thus, a more complex educational experience is facilitated. It is also possible to "enable" this and other optional features only after passing a specific marker which can comprise a specific license code, e.g. stored in its machine-readable information item.

In yet another advantageous embodiment, the self-moving vehicle is adapted to be connectable to a computer and/or a smartphone and/or a tablet computer for uploading and/or downloading information. This can be achieved, e.g. via a USB, WLAN, or BLE interface. Then, additional data (e.g. from a previous playrun of the toy) becomes available and can be visualized on a computer or smartphone and additional functions are easier to implement on the toy (e.g. firmware update, upload audio stories to read on certain markers etc.)

Advantageously, the self-moving vehicle is single-pieced, i.e. it does in particular not comprise a body and a user-interchangeable head (during operation). This facilitates production and keeps maintenance efforts lower.

In another advantageous embodiment, the toy comprises a second self-moving vehicle. Optionally, the first self-moving vehicle can respond to a first group of markers only while the second self-moving vehicle responds solely to a second group of markers. This marker-set vehicle assignment information is preferably stored as instruction set in the machine-readable information items of the markers. This increases the educational impact of the toy because the children's experience is enhanced by the plurality of self-moving vehicles. As obvious to the skilled person, more than two self-moving vehicles can also be present in the educational toy.

Then, preferably, the first self-moving vehicle and the second self-moving vehicle each comprises a communication device which is adapted for exchanging information about the respective self-moving vehicle with the other self-moving vehicle (e.g. position, bearing, distance etc.). Thus, the educational impact of the toy is enhanced by an interaction of the vehicles.

In yet another advantageous embodiment of the toy, information about a previous playrun of the self-moving vehicle is stored in a memory of the self-moving vehicle. This information in particular comprises information about the marker(s) as read out during the previous playrun. This information can then be used for a replay of the previous playrun in an absence of the marker(s). In other words, once the self-moving vehicle has completed a playrun in the presence of the marker(s), the children can take away the marker(s) and repeat the playrun in the absence of the marker(s). This increases the educational impact of the toy because it can be taught to the children in an easier way how a "computer" runs a "program" once it has been "programmed" with an instruction set.

BRIEF DESCRIPTION OF SEVERAL VIEWS OF THE DRAWINGS

The invention and its embodiments will be more fully appreciated by reference to the following detailed description of presently preferred but nonetheless illustrative embodiments in accordance with the present invention when taken in conjunction with the accompanying drawings.

DETAILED DESCRIPTION OF THE INVENTION

Figure 1:
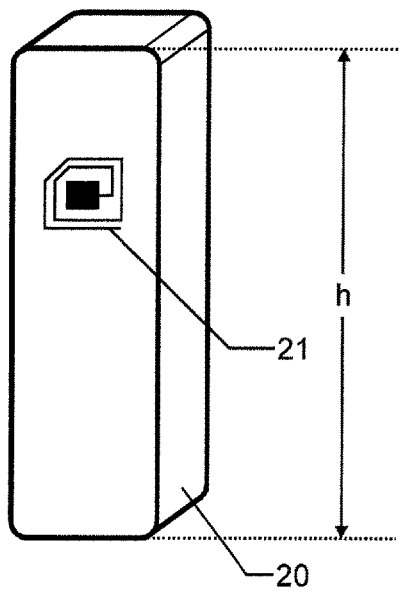
FIG. 1 shows a perspective view of a first three-dimensional marker 20 with a machine-readable information item 21 and a height h.

FIG. 1 shows a perspective view of a first tangible three-dimensional marker 20 as part of an embodiment of the invention with a machine-readable information item 21 in the form of a passive RFID tag without an energy source. The RFID tag can be interrogated by an RFID reader (sensor 11 of the vehicle 10, see below) and, upon an RFID broadcast, echoes back a vehicle-action instruction that is to be triggered by the marker 20. As an example, marker 20 echoes back 0x47 as instruction, which corresponds to "turn 90 degrees left". Other information can be exchanged as well, such as an RFID serial number 08:A8:BF:C0. The marker 20 is made predominantly of a wooden block (except for the RFID tag) and is covered with a blue varnish (not shown). The marker 20 has dimensions of 3 cm×3 cm and a height h of 10 cm. Other materials and/or dimensions and/or shapes are possible as well. The marker 20 can be placed freely on a two-dimensional surface (not shown).

Figure 2:
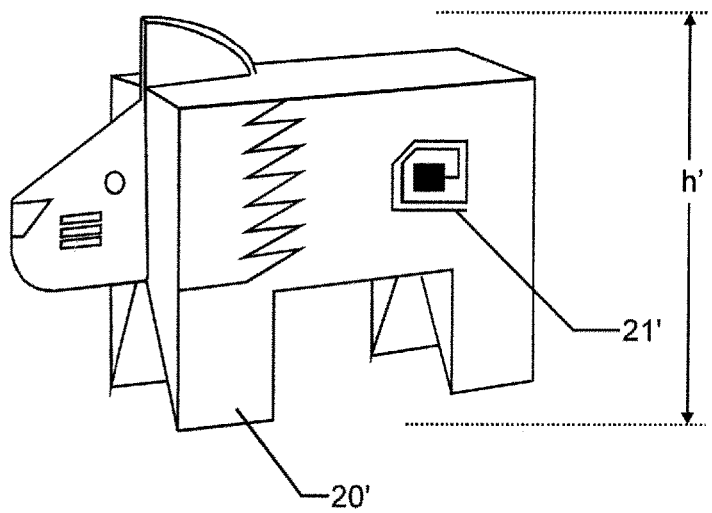
FIG. 2 shows a perspective view of a second three-dimensional marker 20' with a machine-readable information item 21' and a height h'.

FIG. 2 shows a perspective view of a second tangible three-dimensional marker 20' as part of an embodiment of the invention with a machine-readable information item 21' in the form of a passive RFID tag without an energy source. The RFID tag can be interrogated by an RFID reader (sensor 11 of the vehicle 10, see below) and, upon an RFID broadcast, echoes back a vehicle-action instruction that is to be triggered by the marker 20'. As an example, marker 20' echoes back 0x51 as instruction, which corresponds to "stop, play lion story, and then go straight". Other information can be exchanged as well, such as an RFID serial number 08:B1:C1:F3. Because of the different instructions, the marker 20 as shown in FIG. 1 and the marker 20' can be distinguished by the vehicle 10. The marker 20' is made predominantly of folded cardboard (except for the RFID tag) and has a form and printed pattern that it resembles a lion. The marker 20' has dimensions of 10 cm×5 cm and a height h' of 8 cm. Other materials and/or dimensions and/or shapes are possible as well. The marker 20' can be placed freely on a two-dimensional surface (not shown).

Figure 3:
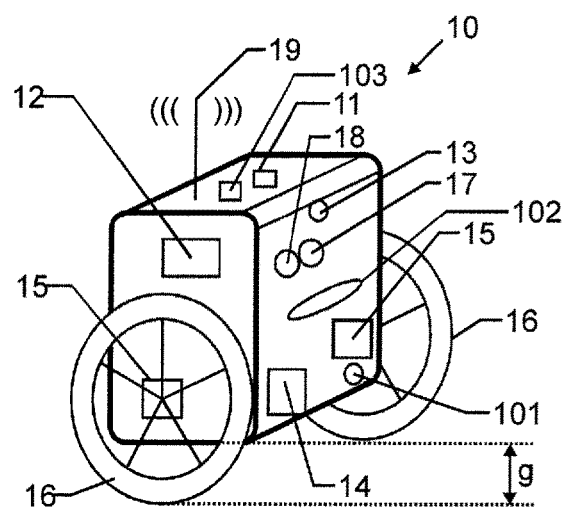
FIG. 3 shows a perspective view of a self-moving vehicle 10 with—inter alia—a ground clearance g, a sensor 11, and a control unit 12.

FIG. 3 shows a perspective view of a single-pieced self-moving vehicle 10 as part of the invention with a ground clearance g of 3 cm. Thus, the vehicle 10 cannot run over the markers 20, 20' as shown in FIGS. 1 and 2, respectively, because its ground clearance g is smaller than the heights h, h' of the markers 20, 20'.

The vehicle 10 can be placed freely on a two-dimensional surface (not shown) and is adapted to move and. steer freely on this surface (see below). For this, the vehicle 10 comprises wheels 16 that are driven by electric motors 15. Chains 16' would also be possible (not shown). Energy for the motors 15 and the other components of the vehicle 10 is provided by a rechargeable LiPo battery 14 that is detachably connected to the vehicle 10. Further, the vehicle 10 comprises a sensor 11 in the form of an RFID reader, which is adapted for a wireless readout of the machine-readable information items 21, 21' of the markers 20, 20' as shown in FIGS. 1 and 2. For this, the RFID reader sends an RFID broadcast and receives, optionally together with a marker's serial number and optionally additional information, a specific marker instruction as stored in the RFID tags 21, 21' of the markers 20, 20'.

By means of the instructions and/or the optional serial numbers, the markers 20, 20' can be distinguished by the vehicle 10. In addition, the vehicle 10 comprises a control unit 12 in the form of a programmable microcomputer including memory which is adapted for controlling an operation of the self-moving vehicle 10 depending on the machine-readable information items 21, 21' as read out by the sensor 11 and depending on other information. As an example, the vehicle 10 will turn 90 degrees left upon reading an instruction 0x47 from a machine-readable information item 21 of a marker 20 as shown in FIG. 1. The mentioned other information is, e.g. provided by an obstacle sensor 17, an image acquisition device 13 in the form of a camera with connected image recognition logic (not shown), and a bearing sensor 18 in the form of a gyroscope-magnetometer combination. Data from an image I as provided by the camera 13 is also used for sensing the bearing/course/course deviation of the vehicle 10 when in motion. Specifically, an edge detection is performed on consecutive images I and a path of the vehicle 10 is calculated and, if necessary, corrected by supplying adequate control signals to the motors 15. Thus, it is easier for the vehicle 10 to navigate on a straight path or go towards a specific landmark such as the next marker if desired. In addition, the vehicle 10 further comprises a communication device 19 for exchanging information with other vehicles 10' (see below) or with a computer or smartphone. This communication device 19 in the form of a WLAN interface can therefore also be used to connect the vehicle 10 to a computer for, e.g. updating the software of the vehicle 10 and/or up- or downloading vehicle specific data. Further, the vehicle 10 comprises a headlight 102 (which can be switched on and off using a marker) and a loudspeaker 101 (for playing a sound and/or reading a story) and control button(s) 103 (e.g. for starting a movement of the vehicle).

Figure 4:
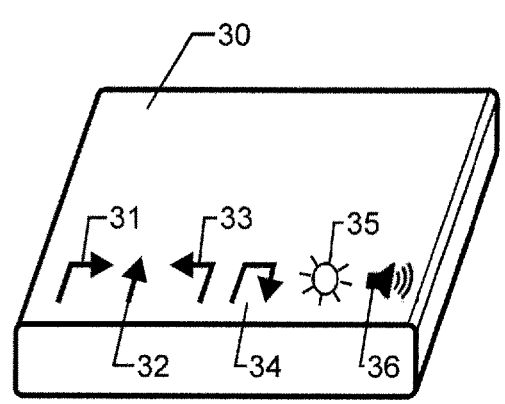
FIG. 4 shows a perspective view of a configurator 30.

FIG. 4 shows a perspective view of a configurator 30 as part of an embodiment of the invention. The configurator 30 is adapted for configuring actions of the vehicle 10 as shown in FIG. 3 in response to a readout of a specific machine-readable information item 21, 21' of the markers as shown in FIGS. 1 and 2, respectively. The configurator 30 comprises touch sensitive buttons 31-36 which can be actuated by a user. As an example, when a user presses button 34 ("make a right U-turn") and brings the marker 20 of FIG. 1 into the vicinity of the configurator 30, the action-instruction 0x50 is written to the RFID tag 21 of the marker 20. Then, upon reading the command 0x50 from the RFID tag 21 of the marker 20 at a later time by means of its sensor 11, the vehicle 10 is triggered to make a right U-turn.

Examples for other actions are shown as well, i.e. "turn 90 degrees right" for button 31, "go straight" for button 32, "turn 90 degrees left" for button 33, "turn light on" for button 35, and "blow horn" for button 36. Other button and/or additional options for certain behaviors such as setting a turn radius are possible as well. It should be noted here that the configurator 30 can also be implemented differently, for example as a smartphone or tablet computer app.

Figure 5:
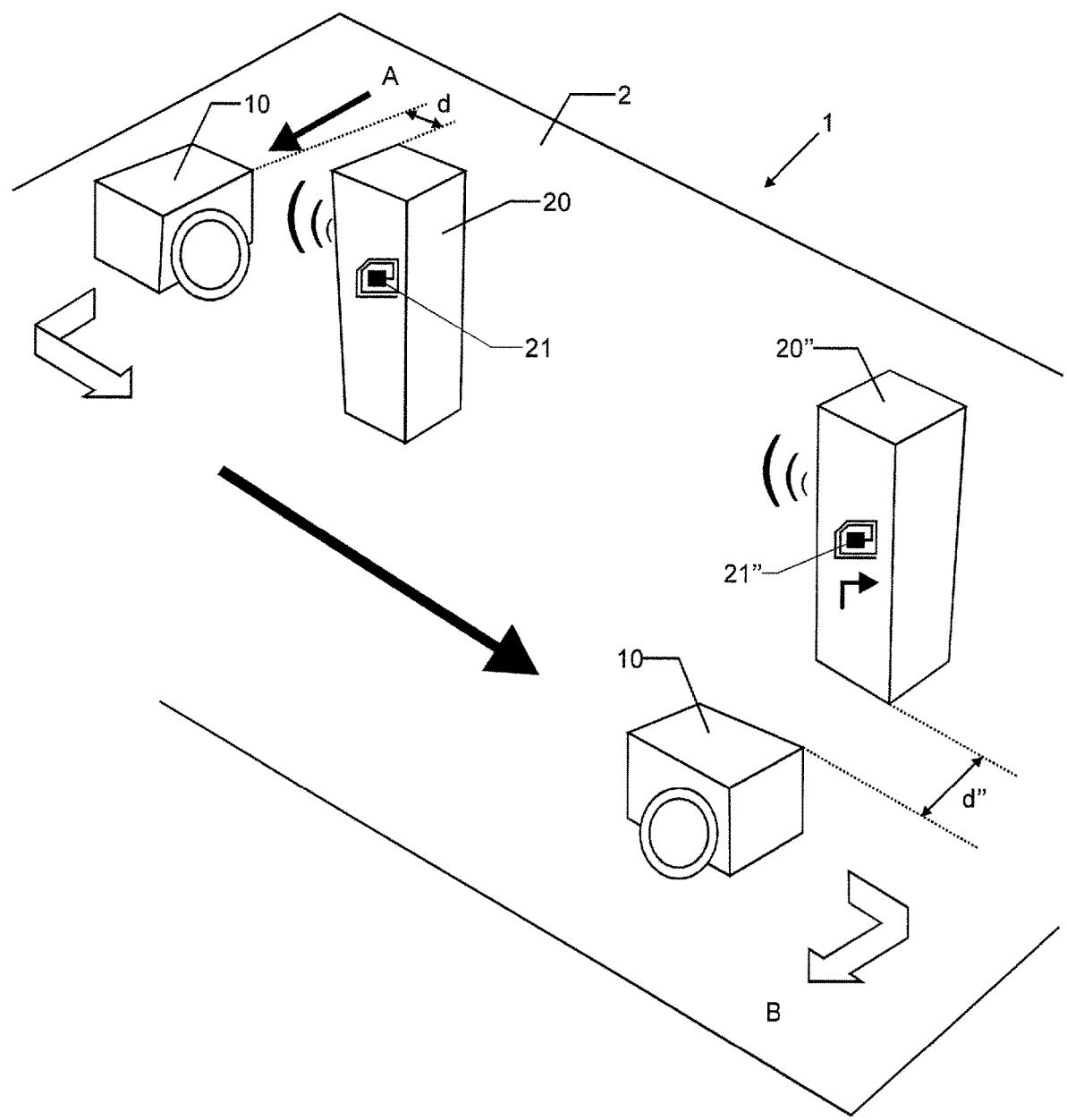
FIG. 5 shows a perspective view of a toy 1 according to a first embodiment of the invention.

FIG. 5 shows a perspective view of a toy 1 according to a first embodiment of the invention. Here, a first marker 20 as shown in FIG. 1 and a second marker 20' are placed on a table leaf as surface 2. The second marker 20" closely resembles the first marker 20 with the exception that an instruction for the first and for the second markers are different such that the markers 20 and 20" are machine-distinguishable by the vehicle 10. Further, a vehicle 10 as shown in FIG. 3 is placed at a starting point A. Then, the vehicle motion is started, e.g. by pressing a dedicated control button 103 on the vehicle 10. The vehicle 10 then moves in a straight line (standard behavior in the absence of a machine-readable information item 21, 21", black arrow in the top of the figure), whereby information from the image acquisition device 13 and from the bearing sensor 18 is used by the control unit 12 to control the motors 15 in such a way that the vehicle 10 moves in a straight line. Upon entering a zone around the first marker 20 below a distance threshold d of 20 cm (readout range for the first machine-readable information item 21 of the first marker 20), the sensor 11 of the vehicle 10 reads the RFID tag 21 of the first marker 20 and knows from the received instruction code 0x47 that a 90 degrees left turn should be triggered in response to the machine-readable information item 21 being read out by the sensor 11 (upper white bended arrow). Thus, the vehicle 10 will take a left turn after passing marker 20. After that, the vehicle goes straight towards the second marker 20" (long black arrow), again using correction signals from an image I acquired by the camera 13 and from the bearing sensor 18. For this, the camera image I comprises the second marker 20" and is detected therein by machine vision algorithms. Upon entering a readout range around the second marker 20" below a distance threshold d of 5 cm, the sensor 11 of the vehicle 10 reads the RFID tag 21" of the second marker 20 and knows from the received instruction code 0x49 that a 90 degrees right turn should be triggered in response to the machine-readable information item 21" being read out by the sensor 11 (lower white bended arrow). Thus, the vehicle 10 will take a right turn in front of marker 20".

It should be noted here that the vehicle 10 would stop its motion, play a sound and wait for further input, e.g. via control buttons 103, after going straight for 2 m without receiving a machine-readable information item 21" (or another machine-readable information item). This feature is implemented for safety purposes and can be modified to other values and/or behaviors. As examples, the vehicle 10 can stop after driving against a wall, turn around on the spot by 180 degrees, stop its motion and wait for further input.

After taking the right turn, the vehicle 10 senses from its obstacle sensor 17 that it is about to fall from the table leaf 2 (obstacle 0) which causes the control unit 12 to stop the motors and play a warning sound via the vehicle's loudspeaker 101 (near end point B). It should be noted here that the triggered actions "turn 90 degrees left" of the first marker 20 has been custom-configured before starting the playrun by means of a configurator 30 as shown in FIG. 4. The triggered action "turn 90 degrees right" of the second marker 20" has not been custom-configured but is a standard action for the second marker 20' (which is also marked with a "90 degrees right" arrow on its surface).

Figure 6:
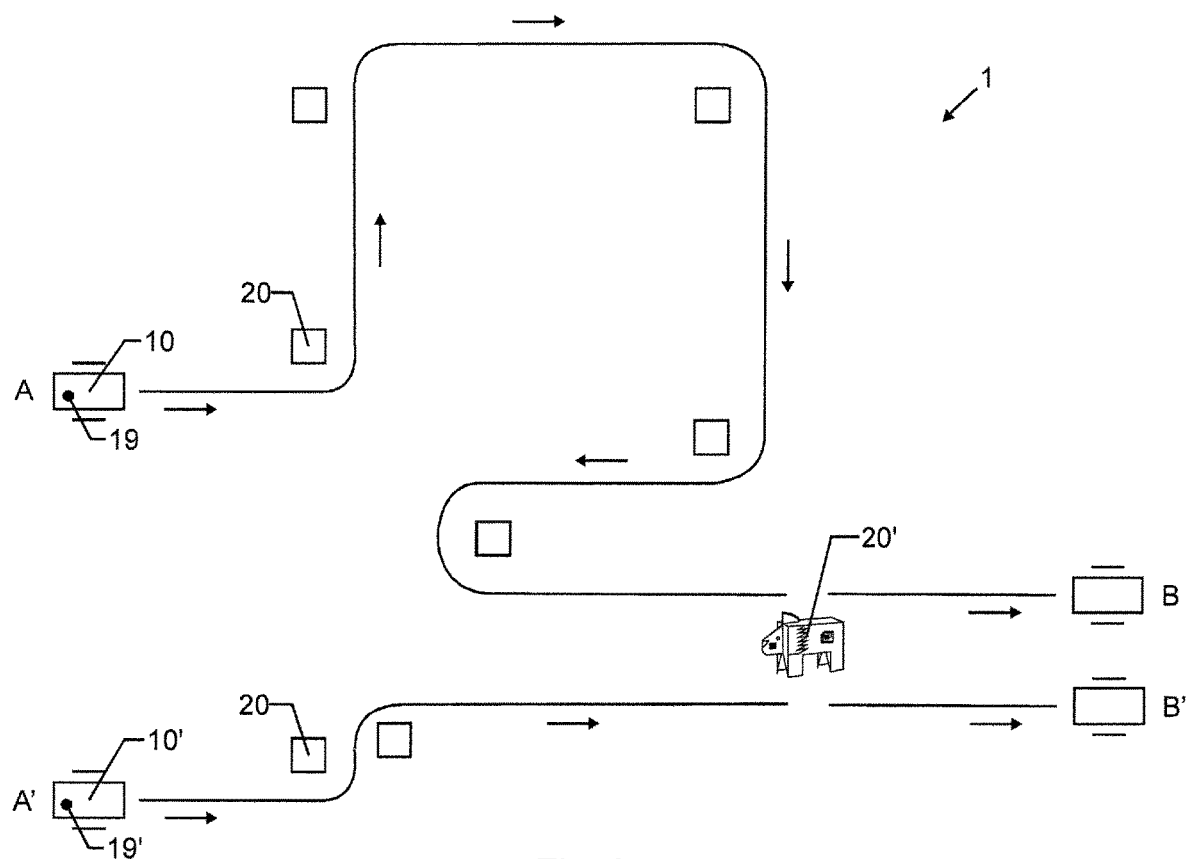
FIG. 6 shows a top view of a toy 1 according to a second embodiment of the invention.

FIG. 6 shows a top view of a toy 1 according to a second embodiment of the invention. Unlike the first embodiment shown in FIG. 5, the second embodiment comprises a first vehicle 10 (initially at a starting point A) and a second vehicle 10' (initially at a starting point A') that exchange information with each other using their respective communication devices 19, 19'. The course of the first vehicle 10 thereby includes a 90 degrees left turn as triggered by the upper marker 20 (corresponding to the read out of a 0x0147 instruction as stored in the RFID tag of the marker 20), a 90 degrees right turn (marker not referenced), another 90 degrees right turn (marker not referenced), another 90 degrees right turn (marker not referenced), a 180 degrees U turn around the (unreferenced) marker, a stopping and telling a first lion story at a lion shaped marker 20' (corresponding to the read out of a 0x0151 instruction as stored in the RFID tag of the marker 20') as shown in FIG. 2, and a straight movement to an end point B.

The course of the second vehicle 10' includes a 90 degrees left turn as triggered by the lower marker 20 (corresponding to the read out of a 0x0247 instruction as stored in the RFID tag of the lower marker 20), a 90 degrees right turn (marker not referenced), a stopping and telling a second lion story at the lion shaped marker 20' (corresponding to the read out of a 0x0251 instruction as stored in the RFID tag of the marker 20') as shown in FIG. 2, and a straight movement to an end point B'. Distinction between the first vehicle 10 course and the second vehicle 10' course is made possible by using blue markers for the first course and red markers for the second course. The vehicles 10, 10' detect the marker colors using their image acquisition devices and only take "own" markers into account while disregarding "foreign" markers. A further course discrimination feature is the addition of a course number in the RFID tags of the specific marker, i.e. 0x0147 and 0x0151 for the first course markers and 0x0247 and 0x0251 for the second course markers. Other encodings are possible as well as obvious to the skilled person.

It should further be noted here that the first lion story:

"The lion, *Panthera leo*, is a species in the family Felidae and a member of the genus *Panthera*. The lion typically inhabits grasslands and savannahs but is absent in dense forest. With some males exceeding 250 kg (550 lb) in weight, it is the second-largest living cat species after the tiger."

differs from the second lion story:

"The lion, *Panthera leo*, is a species in the cat family (Felidae). A muscular, deep-chested cat, it has a short, rounded head, a reduced neck and round ears, and a hairy tuft at the end of its tail. Male lions have a prominent mane, which is the most recognizable feature of the species."

The lion stories have been uploaded to the specific vehicles 10, 10' before running the course using the communication devices 19, 19', respectively. The exchange of information between the vehicles 10 and 10' also ensure that the first and second lion stories are not told at the same time.

Figure 7:
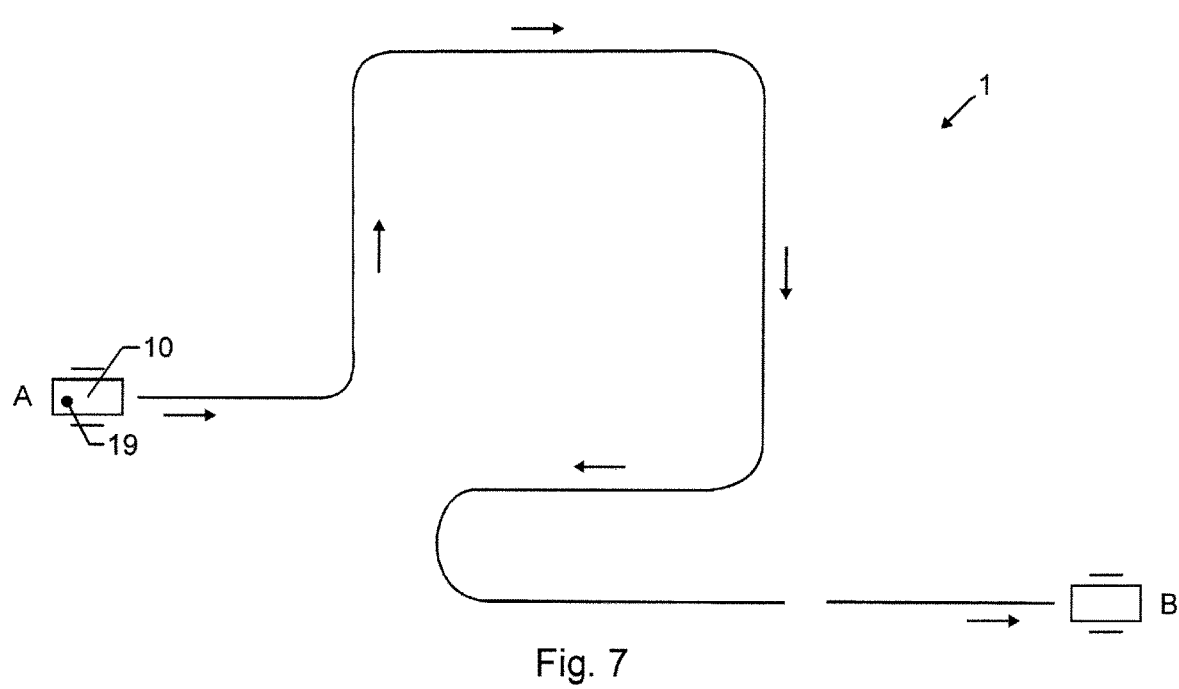
FIG. 7 shows a top view of a toy 1 according to a third embodiment of the invention.

FIG. 7 shows a top view of a toy 1 according to a third embodiment of the invention. In this embodiment, the vehicle 10 as shown in FIG. 6 is, after completing the playrun as described in FIG. 6, brought to the starting point A again and by pressing a control button 103 triggered to re-run the sequence or course as "learned" during the FIG. 6 playrun, but now in the absence of any marker 20, 20'. For this, the vehicle 10 has stored all the required information about the previous FIG. 6 playrun in a memory connected to the control unit 102. Thus, it becomes easier for children to learn about the way, a computer (i.e. the vehicle 10) runs a "program" once it has been "programmed" with an instruction set.

Using the three-dimensional markers (i.e, the wooden toy blocks and the lion) with machine-readable information items enables the users, e.g. children, to build an instruction sequence by laying out the markers in the desired sequence along a path or course. This provides a powerful visual representation of the instruction sequence, which cannot be achieved with other programmable devices. Moreover, the ability to "program" the programmable educational toy in a visual and intuitive manner makes the programming task easier to understand and accessible to children in lower age.

The invention relates to an educational toy 1 comprising a self-moving vehicle 10 adapted to move and steer freely on a two-dimensional surface 2 such as a table leaf. A tangible, three-dimensional marker 20 comprising at least one RFID tag 21 is used to wirelessly trigger a specific action of the vehicle 10, e.g. turn 90 degrees right, when the vehicle 10 enters a readout range of the marker 20. The marker 20 can be placed freely on the surface 2 and cannot be overrun by the vehicle 10. Thus, the vehicle 10 is instructed to perform a certain action, e.g. take a 90 degrees left turn, using the marker 20. Then, the vehicle 10 moves forward until a next marker 20' is found from which the vehicle 10 receives its next instruction. This enables the educational toy 1 to teach programming during play, which reduces the risk that children will lose interest.

While there are shown and described presently preferred embodiments of the invention, it is to be distinctly understood that the invention is not limited thereto but may be otherwise variously embodied and practiced within the scope of the following claims.

The invention claimed is:

1. An educational toy for teaching basic concepts of computer programming to children, comprising:
   at least a first self-moving vehicle adapted to move and steer freely on a two-dimensional surface; and
   at least one tangible, three-dimensional marker comprising at least one machine-readable information item, wherein the marker is adapted to be placeable freely on the surface and wherein the marker has a height (h) above the surface when placed on the surface,
   wherein a ground clearance (g) of the self-moving vehicle is smaller than the height (h) of the marker above the surface, and
   wherein the self-moving vehicle comprises at least one sensor adapted for a wireless readout of the machine-readable information item of the marker and a control unit adapted for controlling the self-moving vehicle depending on the machine-readable information item as read out by the sensor, wherein the toy is adapted to trigger at least one action of the self-moving vehicle in response to the machine-readable information item being read out by the sensor and wherein
   the triggered action comprises at least one of:
   a starting of a movement of the self-moving vehicle and/or
   a stopping of a movement of the self-moving vehicle;
   wherein information about a previous playrun of the self-moving vehicle and information about the marker is stored in a memory of the self-moving vehicle and wherein the self-moving vehicle is configured to replay the previous playrun in an absence of the marker.

2. The toy claim 1, adapted to only trigger the action of the self-moving vehicle when the self-moving vehicle is within a predetermined distance threshold (d) to the marker comprising the machine-readable information item.

3. The toy (1) according to claim 2, wherein the predetermined distance threshold is between 5 and 20 cm.

4. The toy according to claim 3 further comprising:
a configurator for configuring the triggered action of the self-moving vehicle in response to the machine-readable information item as read out by the sensor.

5. The toy according to claim 4, adapted to store configuration data related to the triggered action of the self-moving vehicle in response to the machine-readable information item as read out by the sensor, within the machine-readable information item of the marker.

6. The toy according to claim 1, wherein starting of a movement of the self-moving vehicle and/or the stopping of a movement of the self-moving vehicle is at least one of:
a starting of a movement of the self-moving vehicle in a forward direction,
an acceleration of the self-moving vehicle,
a braking of the self-moving vehicle,
a left turning of the self-moving vehicle,
a right turning of the self-moving vehicle,
a left or right U-turning or turning around of the self-moving vehicle, and
a reversing of a direction of movement of the self-moving vehicle.

7. The toy according to claim 1, wherein the self-moving vehicle further comprises an image acquisition device for acquiring an image (I) and wherein the control unit of the self-moving vehicle is adapted for controlling the self-moving vehicle depending on the image (I).

8. The toy according to claim 7 wherein the image (I) comprises the marker and wherein the control unit of the self-moving vehicle is adapted for controlling the self-moving vehicle depending on the marker in the image (I).

9. The toy according to claim 1, wherein the self-moving vehicle further comprises:
a rechargeable battery,
an electric motor, and
wheels and/or chains adapted to be placeable on the surface.

10. The toy according to claim 1, wherein the machine-readable information item comprises at least one of the group of:
an RFID tag,
a bar code,
a QR code,
a color,
a shape, and
a visible sign.

11. The toy according to claim 1, wherein the marker is a passive device, and does not comprise an energy source.

12. The toy according to claim 1, wherein the marker comprises elements made of wood, plastic, or cardboard.

13. The toy according to claim 1, comprising more than one marker, each marker comprising at least one machine-readable information item and each marker being adapted to be placeable freely on the surface.

14. The toy according to claim 13 wherein at least two markers are machine-distinguishable by the self-moving vehicle, the respective machine-readable information items.

15. The toy according to claim 1, wherein the self-moving vehicle further comprises an obstacle sensor for sensing an approach of the self-moving vehicle to an obstacle (0), and in particular wherein the control unit of the self-moving vehicle is adapted for stopping the movement of the self-moving vehicle on approach of the obstacle (0).

16. The toy according to claim 1, wherein the self-moving vehicle further comprises a bearing sensor for monitoring a direction of movement of the self-moving vehicle, and wherein the control unit of the self-moving vehicle is adapted for adjusting the direction of movement of the self-moving vehicle depending on the direction of movement as monitored by the bearing sensor.

17. The toy according to claim 1, wherein the self-moving vehicle is adapted to be connectable to a computer and/or a smartphone and/or a tablet-computer for uploading and/or downloading information.

18. The toy according to claim 1, wherein the self-moving vehicle is single-pieced.

19. The toy according to claim 1, comprising a second self-moving vehicle.

20. The toy according to claim 19 wherein the first self-moving vehicle and the second self-moving vehicle each comprises a communication device adapted for exchanging information about the respective self-moving vehicle with the other self-moving vehicle.

* * * * *